United States Patent [19]

Ueno

[11] Patent Number: 4,629,721

[45] Date of Patent: Dec. 16, 1986

[54] PROCESS FOR PREPARING DESULFURIZING AND DENITRATING AGENTS

[75] Inventor: Tutomu Ueno, Sapporo, Japan

[73] Assignee: The Hokkaido Electric Power Co., Inc., Japan

[21] Appl. No.: 838,662

[22] Filed: Mar. 12, 1986

[30] Foreign Application Priority Data

Mar. 13, 1985 [JP] Japan .................................. 60-51247
Oct. 25, 1985 [JP] Japan .................................. 60-237195

[51] Int. Cl.$^4$ ......................... B01J 20/04; B01J 20/08; B01J 20/10
[52] U.S. Cl. .................................. 502/411; 502/400; 502/407; 502/415
[58] Field of Search ............... 502/400, 407, 411, 415; 55/74

[56] References Cited

U.S. PATENT DOCUMENTS

4,177,158 12/1979 Blue ................................ 502/400 X
4,316,813 2/1982 Voss ................................ 502/400 x

FOREIGN PATENT DOCUMENTS

58-166932 10/1983 Japan .................................. 502/411

*Primary Examiner*—W. J. Shine
*Attorney, Agent, or Firm*—McGlew and Tuttle

[57] ABSTRACT

This invention relates to a preparation process of desulfurizing and denitrating agents for an off-gas produced upon combustion of a fuel such as coal or heavy oil.

The agent can be obtained by providing as first raw material(s) one or more materials capable of yielding calcium oxide and calcium sulfate, providing as second raw material(s) one or more materials capable of yielding silicon dioxide and aluminum oxide, mixing the first raw material(s) or a mixture of the first raw material(s) and either fractional or whole portion(s) of the second raw material(s) with water, subjecting the resultant aqueous mixture to wet-air aging at room temperature or to steam aging, and optionally subjecting the thus-aged mixture further to a heat treatment at a temperature of 30° C. or higher.

The desulfurizing and denitrating agents of this invention are prepared simply from readily-available raw materials such as cement, slag, coal ash, glass and fluidized-bed combustion ash and show high activity in both desulfurization and denitration. They are thus useful for the prevention of air pollution.

2 Claims, 2 Drawing Figures

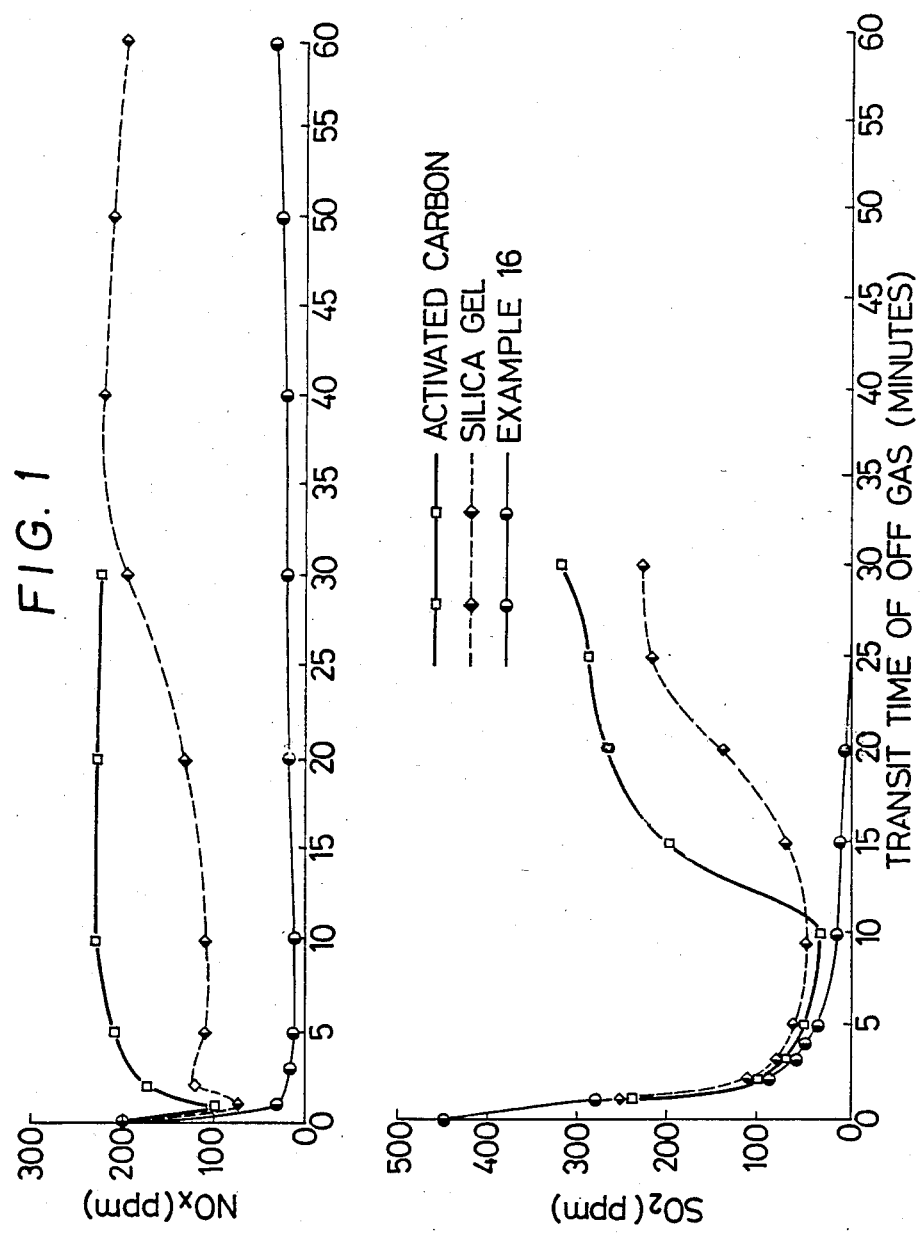

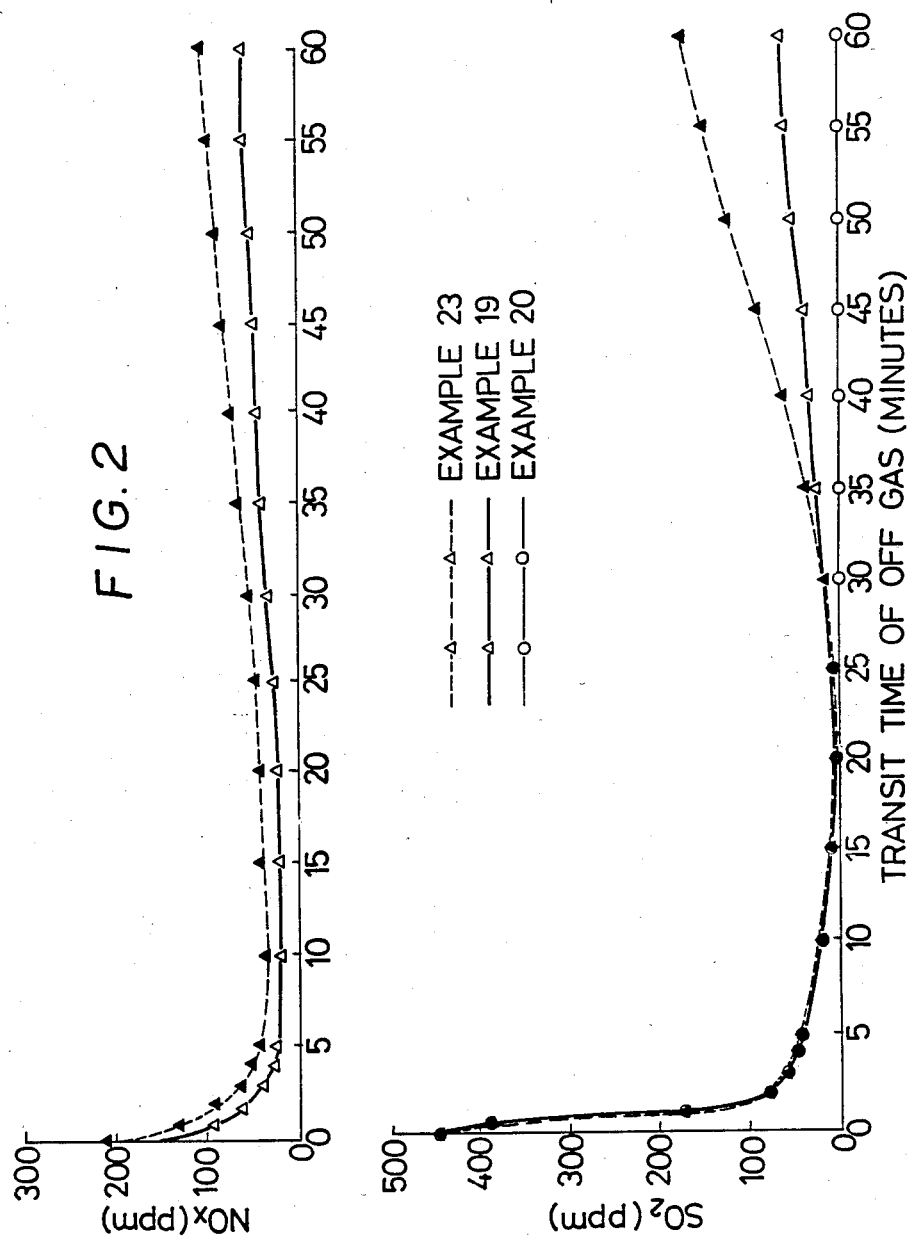

PROCESS FOR PREPARING DESULFURIZING AND DENITRATING AGENTS

BACKGROUND OF THE INVENTION (a) Field of the Invention

This invention relates to a preparation process of desulfurizing and denitrating agents for an off-gas produced upon combustion of a fuel such as coal or heavy oil.

(b) Description of the Prior Art

Sulfur oxides, nitrogen oxides and other noxious gases, which are contained in an off-gas produced upon combustion of coal, heavy oil or other fuels, have been found to cause damage to buildings and structures and moreover to have an extremely serious effect not only on animals and plants but also on humans. Research has been conducted on the removal of the above-described materials from off-gases by means of desulfurization and denitration, leading to the development of various processes.

These desulfurization and/or denitration processes may be roughly divided into dry-type processes and wet-type processes. As dry-type desulfurization processes to which the present invention pertain, there have been known those shown in Table 1.

and having a high running cost because ammonia is oxidized by nitrogen gas and hence consumed completely.

Further, no practical process which permits simultaneous execution of desulfurization and denitration in a dry state has materialized.

SUMMARY OF THE INVENTION

An object of this invention is to solve the above-described various problems of conventional dry-type desulfurization and denitration processes and to provide desulfurizing and denitrating agents which permit simultaneous execution of desulfurization and denitration. This object has been achieved by the following processes:

A process for preparing desulfurizing and denitrating agents, which comprises providing as first raw material(s) one or more materials capable of yielding calcium oxide and calcium sulfate, providing as second raw material(s) one or more materials capable of yielding silicon dioxide and aluminum oxide, mixing the first raw material(s) or a mixture of the first raw material(s) and either fractional or whole portion(s) of the second raw material(s) with water, and then subjecting the resultant aqueous mixture to wet-air aging at room temperature or to steam aging.

TABLE 1

| | | Dry-Type Off-Gas Desulfurization Processes* | | | | |
|---|---|---|---|---|---|---|
| Manner of treatment | Process feature | Reactants | Process name | Reaction temp. | Reaction product | Recovered material |
| Absorption | Reacted with a metal oxide to form sulfate | Activated manganese oxide | Activated manganese oxide process | 130° C. | $MnSO_4$ | Ammonium sulfate |
| | | Alkalized alumina | Alkalized alumina process | 280–360° C. | $Na_2SO_4$ | Sulfur |
| | | Limestone, slaked lime dolomite or dolomite hydroxide | Lime blowing process | 500–1200° C. | $CaSO_4$, etc. | Mixture of unreacted lime oxide and gypsum |
| Adsorption | Adsorption of $SO_2$ with an adsorbent | (Adsorbent) Activated carbon | Activated carbon process | 100° C. | $H_2SO_4$ | Sulfuric acid |
| | | | Reinluft process | 100° C. | $SO_2$ | Sulfur |
| Catalytic oxidation | Oxidation of $SO_2$ into $SO_3$ by a catalyst | (Catalyst) Vanadium-base catalyst | Benelec process (for coal boilers) | 420–480° C. | $SO_3$ | Sulfuric acid |
| | | | TIT-Kiyoura process | 220–260° C. | $(NH_4)_2SO_4$ | Ammonium sulfate, sulfuric acid |

*Cited from the following publication:
"Smoke and Soot Control Technology Series, No. 7 Smoke and Soot Control Technology for Electric Power Industry", Government of Japan, Ministry of Industrial Science and Technology, Enterprise Bureau and Public Benefit Utilities Bureau, (1969).

The above-described conventional dry-type desulfurization processes however involve a variety of problems. In the absorption processes shown in Table 1, it is required, for example, to use costly $NH_3$ (the activated manganese oxide process) or a valuable reducing gas (the alkalized alumina process) for the regeneration of the reactants (and for the recovery of sulfur or sulfur compounds) or to employ a high reaction temperature (the alkalized alumina and lime blowing processes). The adsorption processes are accompanied by such drawbacks as having to use expensive activated carbon, which is susceptible to deterioration. In the catalytic oxidation processes, it is necessary to use expensive vanadium-base catalysts, which, moreover, are liable to deterioration, and relatively-high reaction temperatures are required.

It is the catalytic reduction process making use of ammonia that is widely used as a dry-type denitration process. This process is however accompanied by such problems as having to rely upon an expensive catalyst A process for preparing desulfurizing and denitrating agents, which comprises providing as first raw material(s) one or more materials capable of yielding calcium oxide and calcium sulfate, providing as second raw material(s) one or more materials capable of yielding silicon dioxide and aluminum oxide, mixing the first raw material(s) or a mixture of the first raw material(s) and either fractional or whole portion(s) of the second raw materials with water, subjecting the resultant aqueous mixture to wet-air aging at room temperature or to steam aging, and then subjecting the thus-aged mixture to a heat treatment at a temperature of 30° C. or higher.

The desulfurizing and denitrating agents prepared in accordance with the above-described processes of this invention are different from conventional absorbents and adsorbents and are composed of one or more materials capable of yielding CaO and $CaSO_4$ and optionally one or more additional materials capable of yielding $SiO_2$ and $Al_2O_3$. As their raw materials may thus be used silicic acid salts or calcium compounds such as cement, slag, glass, coal ash or fluidized-bed combustion ash. Accordingly, usable raw materials may be chosen from a wide range of materials. Furthermore, the desulfurizing and denitrating agents of this invention can be prepared by the simple step of wet-air aging or steam aging.

Since the desulfurizing and denitrating agents prepared in accordance with the above-described processes of this invention permit effective reutilization of waste materials such as coal ash, slag, glass and fluidized-bed combustion ash, they are useful as a technique for recycling such waste materials as resources and in addition, they permit simultaneous and efficient execution of desulfurization and denitration. Therefore, the desulfurizing and denitrating agents have brought about a significant contribution to the prevention of pollution.

BRIEF DESCRIPTION OF THE DRAWINGS

FIG. 1 is a graph showing one example of comparison in performance between a desulfurizing and denitrating agent obtained in accordance with the latter process of this invention and conventional adsorbents; and FIG. 2 is a graph showing performances of other desulfurizing and denitrating agents obtained in accordance with the latter process of this invention.

DETAILED DESCRIPTION OF THE INVENTION

As exemplary materials capable of yielding calcium oxide and useful in the practice of this invention may be mentioned quick lime, slaked lime, lime carbonate, cement, slag and dolomite plaster (with lime contained therein).

Illustrative of the material capable of yielding calcium sulfate may include gypsum dihydrate, gypsum hemihydrate, quick lime, slaked lime, a combination of lime carbonate and sulfuric acid and calcium sulfite.

Illustrative of the material capable of yielding silicon dioxide may embrace silica, metasilicic acid, aluminum silicate and calcium silicate as well as compounds containing reactive silicon dioxide, such as cristobalite, tridymite, kaolin, bentonite, talc, perlite, shirasu (i.e., white volcanic ash similar to acid glass or pumice in nature and its secondary deposit, which is available abundantly and widely in the southern part of Kyushu, Japan), diatomaceous earth and glass.

As illustrative examples of the material capable of yielding aluminum oxide may be mentioned compounds containing reactive aluminum, such as alumina, aluminum hydroxide, aluminum silicate, alumina sulfate, alum, aluminum sulfide, aluminum sulfate, aluminum chloride, bentonite, kaolin, diatomaceous earth, zeolite and perlite.

Furthermore, as other exemplary materials each of which can yield two or more of the above-mentioned four types of compounds may be mentioned coal ash (source for calcium oxide, silicon dioxide and aluminum oxide), cement (source for calcium oxide, calcium sulfate, silicon dioxide and aluminum oxide), slag, and minerals containing reactive silicon dioxide, aluminum, calcium and/or similar minerals, such as shirasu, andesite, chert, quartz trachyte, opal, zeolite, feldspar, clay minerals and ettringite, as well as furnace desulfurization ash such as fluidized-bed combustion ash and desulfurization byproducts obtained by stack gas desulfurization.

The present inventor combined materials which can yield the above-described four types of compounds (calcium oxide, calcium sulfate, silicon dioxide and aluminum oxide, hereinafter referred to as "base materials") in various ways, and then mixed the resultant mixture with water in order to harden them. The thus-obtained samples were tested to determine their desulfurizing and denitrating performances. As a result, it was found that they give unexpectedly-good performances depending on the combination of the base materials and their preparation process, leading to completion of this invention.

In the present invention, one or more materials capable of yielding calcium oxide and calcium sulfate are called "first raw material(s)". It should however be borne in mind that sufficient desulfurization and denitration effects can still be brought about by a combination of these base materials only. Calcium oxide and calcium sulfate, which are yielded, show satisfactory desulfurization and denitration effects over a wide ratio of 1:99 to 99:1. It is however preferred to control the proportions of calcium oxide and calcium sulfate at 80:20.

The desulfurizing and denitrating performance can be improved further by combining one or more materials which yield silicon dioxide and/or aluminum oxide and are called "second raw material(s)" in the present invention, with the above-described first raw material(s).

The proportions of the base materials are:

| CaO | at least 1% |
| CaSO$_4$ | at least 0.1% |
| SiO$_2$ | 0–90% |
| Al$_2$O$_3$ | 0–70%. |

The following proportions are however preferred:

| CaO | 1%–80% |
| CaSO$_4$ | 0.1%–70% |
| SiO$_2$ | 5–90% |
| Al$_2$O$_3$ | 5–70%. |

Raw materials are ground if needed, followed by proportioning. Water is added further and is then mixed with the above-ground and proportioned raw materials. If one of the combined raw materials is, for example, dilute sulfuric acid and sufficient water is contained in the dilute sulfuric acid, it is unneccessary to add water subsequent to their proportioning. It is suitable to add water in an amount of about 20 parts to about 50 parts per 100 parts of dry raw materials.

The resultant mixture is then subjected to wet-air aging at room temperature or to steam aging. In the case of wet-air aging, it is preferred to conduct it for about 1 week at a relative humidity of 50–100%. Steam aging may preferably be carried out at a temperature of 60° C.–100° C. and a relative humidity of 100% for 5–72 hours.

The thus-aged and hardened mixture is ground or granulated and classified by usual methods to obtain the desulfurizing and denitrating agent of this invention.

Its desulfurizing and denitrating performance can be improved further by subjecting the above-aged and hardened mixture to a heat treatment at 30° C. or higher, preferably, within a temperature range of 50° C.–200° C. for 1–10 hours.

The present invention will hereinafter be described in further detail by the following Examples.

EXAMPLES 1-11

Commercial slaked lime, calcium sulfate, silicic acid, aluminum hydroxide, calcium silicate and aluminum silicate were proportioned and mixed in accordance with compositions shown in Table 2. Water was added to the resulting mixtures, followed by further mixing. The thus-prepared mixtures were subjected to steam aging at 100° C. for 24 hours, and the resultant hardened mixtures were ground and classified to 0.5-0.7 mm in particle size. They were heat-treated at 130° C. for 2 hours to obtain desulfurizing and denitrating agents of this invention. The percentages of base materials CaO, $CaSO_4$, $SiO_2$ and $Al_2O_3$ in each of the agents (hereinafter called "composition of base materials") are given along with results of their performance tests in Table 4.

As their performance tests, desulfurization tests ($SO_2$ removing tests) were carried out at a gas temperature of 130° C. under the test conditions given in Table 3. Measurement data of their specific surface areas are also shown in the same table. Measurement of their specific surface areas was effected in accordance with the BET method subsequent to degasfication of the samples at 200° C. for 1 hour.

EXAMPLES 12-16

To portions of coal ash having the composition shown in Table 5 and containing $SiO_2$ and $Al_2O_3$ at high levels, dilute sulfuric acid solutions having concentrations of 1-12 wt. % were added in the weight proportions given in Table 6. After treating the coal ash portions with the corresponding dilute sulfuric acid solutions at room temperature for 1-2 days, slaked lime ($Ca(OH)_2$) was added in accordance with Table 6. The resultant mixtures were subjected to steam aging in the same manner as in Examples 1-11 to harden them. They were thereafter ground and classified to 0.5-0.7 mm in grain size. The thus-ground and classified samples were dried at 130° C. for 2 hours to obtain the desulfurizing and denitrating agents of this invention.

Proportions of the base materials in each of the agents are shown in Table 7, along with results of their performance tests.

Test conditions were the same as those employed in Examples 1-11. The tests were each carried out at gas temperatures of 50° C., 80° C. and 120° C. Measurement data of their specific surface areas are also given in the same table. In addition, time-dependent variations in denitrating and desulfurizing performance of the sample of Example 16 at 80° C. are shown in FIG. 1, together with results obtained with the samples (activated carbon and silica gel) of the Comparative Examples which will be described later. For the sake of comparison, similar tests were also conducted on samples which had each been obtained by calcining three types of coal ash samples at 1,000° C. They however showed substantially no desulfurizing and denitrating effects.

TABLE 2

Proportions of Raw Materials

| Example | $Ca(OH)_2$ | $CaSO_4 \cdot 2H_2O$ | $CaSO_4 \cdot \frac{1}{2}H_2O$ | Calcium silicate | Aluminum silicate | $H_2SiO_3$ | $Al(OH)_3$ |
|---|---|---|---|---|---|---|---|
| 1 | 27.9% | 45.7% | — | 26.4% | — | — | — |
| 2 | 27.9% | 58.9% | — | — | 13.2% | — | — |
| 3 | 90% | — | 10% | — | — | — | — |
| 4 | 80% | — | 20% | — | — | — | — |
| 5 | 60% | — | 40% | — | — | — | — |
| 6 | 55% | — | 40% | 5% | — | — | — |
| 7 | 55% | — | 40% | — | 5% | — | — |
| 8 | 55% | — | 40% | 2.5% | 2.5% | — | — |
| 9 | 27% | 63% | — | — | — | — | 10% |
| 10 | 24% | 56% | — | — | — | 11% | 9% |
| 11 | 22% | 50% | — | — | — | 20% | 8% |

TABLE 3

| Composition of model gas used | Amount |
|---|---|
| $SO_2$ (ppm) | 450 |
| $NO_x$ (ppm) | 230 |
| $O_2$ (%) | 6 |
| $CO_2$ (%) | 13 |
| $H_2O$ (%) | 10 |
| $N_2$ (%) | Balance |
| Gas volume rate of flow (l/hr) | 60 |
| Amount of packed desulfurizing and denitrating agent (ml) | 6 |
| Space velocity (SV) ($hr^{-1}$) | 10,000 |
| Reaction temperature (°C.) | 130 |

TABLE 4

| Example | Composition of base material (%) CaO | $CaSO_4$ | $SiO_2$ | $Al_2O_3$ | Rate of SO removal (%) | Specific surface area (m/g) |
|---|---|---|---|---|---|---|
| 1 | 26 | 42 | 32 | 0 | 84 | 20 |
| 2* | 33 | 67 | 0 | 20 | 77 | 16 |
| 3 | 88 | 12 | 0 | 0 | 51 | 8 |
| 4 | 76 | 24 | 0 | 0 | 62 | 10 |
| 5 | 55 | 45 | 0 | 0 | 39 | 14 |
| 6* | 55 | 39 | 6 | 0 | 43 | 13 |
| 7* | 55 | 39 | 0 | 6 | 64 | 14 |
| 8* | 55 | 39 | 3 | 3 | 74 | 14 |

TABLE 4-continued

| Example | Composition of base material (%) CaO | $CaSO_4$ | $SiO_2$ | $Al_2O_3$ | Rate of SO removal (%) | Specific surface area (m/g) |
|---|---|---|---|---|---|---|
| 9 | 25 | 58 | 0 | 17 | 29 | 3 |
| 10 | 23 | 52 | 11 | 14 | 99 | 11 |
| 11 | 21 | 47 | 19 | 13 | 100 | 45 |

*$SiO_2$ and $Al_2O_3$ are shown in terms of calcium silicate and aluminum silicate, respectively.

TABLE 5

| Chemical Composition of Coal Ash | |
|---|---|
| Ignition loss | 1.0% |
| $SiO_2$ | 60% |
| $Al_2O_3$ | 23% |
| CaO | 4% |
| $Fe_2O_3$ | 5% |
| MgO | 2% |

TABLE 5-continued

Chemical Composition of Coal Ash

| | |
|---|---|
| Na₂O | 0.7% |
| K₂O | 1.3% |
| TiO₂ | 1.0% |
| Others | 2.0% |

*In terms of 100% sulfuric acid

TABLE 6

| | Material | | |
|---|---|---|---|
| Example | Coal ash | Slaked lime | Sulfuric acid* |
| 12 | 80.5% | 19% | 0.5% |
| 13 | 80% | 19% | 1% |
| 14 | 79% | 19% | 2% |
| 15 | 77% | 19% | 4% |
| 16 | 75% | 19% | 6% |

*In terms of 100% sulfuric acid

TABLE 7

| | Proportions of base materials (%) | | | | Rate of SO₂ removal (%) | | | Specific surface |
|---|---|---|---|---|---|---|---|---|
| Example | CaO | CaSO₄ | SiO₂ | Al₂O₃ | 50° C. | 80° C. | 120° C. | area (m/g) |
| 12 | 18.0 | 0.6 | 51 | 19.4 | 90 | 75 | 65 | 13 |
| 13 | 17.9 | 1.2 | 51 | 19.4 | 96 | 86 | 74 | 14 |
| 14 | 17.4 | 2.2 | 50.3 | 19.3 | 96 | 89 | 80 | 25 |
| 15 | 16.3 | 4.5 | 49.5 | 19.0 | 96 | 94 | 82 | 61 |
| 16 | 15.2 | 6.9 | 48.7 | 18.7 | 98 | 96 | 87 | 45 |

EXAMPLES 17-20

To portions of coal ash of the same type as that employed in Examples 12-16, calcium sulfate dihydrate and slaked lime were mixed in the weight proportions given in Table 8. The resultant mixtures were subjected to steam aging, grinding, classification and drying in the same manner as in Examples 12-16 to obtain the desulfurizing and denitrating agents of this invention.

TABLE 8

| | Material | | |
|---|---|---|---|
| Example | Coal ash | Slaked lime | Calcium sulfate* |
| 17 | 80.7% | 18.6% | 0.7% |
| 18 | 80.4% | 18.2% | 1.4% |
| 19 | 79.4% | 17.5% | 2.8% |
| 20 | 77.0% | 15.0% | 8.0% |

*Percentage in terms of CaSO₄ in the dihydrate.

Proportions of the base materials in each of the agents, results of their performance tests conducted under the same test conditions as those employed in Examples 12-16 and their measurement results are shown in Table 9. In addition, time-dependent variations in denitrating and desulfurizing performance of the samples of Examples 19 and 20 at 80° C. are shown in FIG. 2.

TABLE 9

| | Proportions of base materials (%) | | | | Rate of SO₂ removal (%) | | | Specific surface |
|---|---|---|---|---|---|---|---|---|
| Example | CaO | CaSO₄ | SiO₂ | Al₂O₃ | 50° C. | 80° C. | 120° C. | area (m/g) |
| 17 | 18.1 | 0.7 | 50.7 | 19.5 | 95 | 83 | 72 | 12 |
| 18 | 17.8 | 1.5 | 50.4 | 19.4 | 90 | 79 | 68 | 17 |
| 19 | 17.2 | 2.9 | 49.9 | 19.2 | 94 | 90 | 78 | 19 |
| 20 | 15.0 | 8.3 | 47.9 | 18.4 | 100 | 100 | 100 | 49 |

EXAMPLES 21-23

To portions of coal ash of the same type as that employed in Examples 12-16, portland cement of a composition given in Table 10 was mixed in the weight proportions given in Table 11, followed by the addition of water and subsequent mixing. The resultant mixtures were subjected to steam aging, grinding, classification and drying in the same manner as in Examples 12-16 to obtain the desulfurizing and denitrating agents of this invention.

TABLE 10

Chemical Composition of Portland Cement (wt. %)

| | |
|---|---|
| Ignition loss | 1.6% |
| SiO₂ | 21.2% |
| Al₂O₃ | 5.4% |
| CaO | 63.1% |
| Fe₂O₃ | 4.2% |
| MgO | 1.1% |
| CaSO₄ | 2.7% |
| Na₂O | 0.4% |
| K₂O | 0.1% |
| Others | 0.2% |

TABLE 11

| | Material | |
|---|---|---|
| Example | Coal ash | Portland cement |
| 21 | 20% | 80% |
| 22 | 40% | 60% |
| 23 | 80% | 20% |

Proportions of the base materials in each of the desulfurizing and denitrating agents, results of their performance tests conducted under the same test conditions as those employed in Examples 12-16 and their measurement results are shown in Table 12. In addition, time-dependent variations in denitrating and desulfurizing performance of the sample of Example 23 at 80° C. are also shown in FIG. 2.

TABLE 12

| | Proportions of base materials (%) | | | | Rate of SO₂ removal (%) | | | Specific surface |
|---|---|---|---|---|---|---|---|---|
| Example | CaO | CaSO₄ | SiO₂ | Al₂O₃ | 50° C. | 80° C. | 120° C. | area (m/g) |
| 21 | 51.3 | 2.2 | 29.0 | 8.9 | 55 | 40 | 28 | 4 |

TABLE 12-continued

| Example | Proportions of base materials (%) | | | | Rate of SO$_2$ removal (%) | | | Specific surface area (m/g) |
| --- | --- | --- | --- | --- | --- | --- | --- | --- |
| | CaO | CaSO$_4$ | SiO$_2$ | Al$_2$O$_3$ | 50° C. | 80° C. | 120° C. | |
| 22 | 39.5 | 1.6 | 26.7 | 12.4 | 50 | 37 | 20 | 5 |
| 23 | 15.8 | 0.5 | 52.2 | 19.5 | 89 | 85 | 74 | 7 |

COMPARATIVE EXAMPLE 1

Performance tests were carried out under the same conditions as those used in Examples 12–16 except that commercial activated carbon, which was used for gas chromatography, and commercial crushed silica gel desiccant were each classified to grain sizes of 0.5–0.7 mm and the SV was changed to 2,400 hr$^{-1}$. The specific surface areas of the activated carbon and crushed silica gel were also measured. Test and measurement results are shown in Table 13. In addition, time-dependent variations in in denitrating and desulfurizing performance of the activated carbon and crushed silica gel at 80° C. are also shown in FIG. 1.

TABLE 13

Performances of Activated Carbon, Etc.

| Sample | Rate of SO$_2$ removal (%) | | | Specific surface area (m/g) |
| --- | --- | --- | --- | --- |
| | 50° C. | 80° C. | 120° C. | |
| Activated carbon | 76 | 70 | 47 | 1,080 |
| Silica gel | 77 | 56 | 21 | 530 |

EXAMPLE 24

This Example describes results of a performance test of the desulfurizing and denitrating agent (grain size: 3–10 mm) obtained in the above-described Example 20 in Table 8, on a combustion off-gas from an operating boiler.

TABLE 14

| Composition of off-gas | Amounts |
| --- | --- |
| SO$_2$ (ppm) | 355–520 |
| NO$_x$ (ppm) | 232–315 |
| O$_2$ (%) | 7.6–7.9 |
| CO$_2$ (%) | 11.0–11.6 |
| H$_2$O (%) | 8.2–10.6 |
| N$_2$ (%) | Balance |
| Dust (mg/Nm$^3$) | 200–940 |
| Gas volume rate of flow (Nm$^3$/hr) | 50 |
| Gas temperature (°C.) | 132 |
| Amount of packed desulfurizing and denitrating agent (kg) | 64 |
| Packing density (kg/l) | 0.64 |

As to performance, the desulfurization rate was maintained at 100% for 77 hours, at 90% and higher for 94 hours and at 20% and higher for 94 hours. In the performance test, SO$_2$ was absorbed in an amount of 100 mg or more per gram of the desulfurizing and denitrating agent. It was thus confirmed that almost 100% of the calcium contained in the desulfurizing and denitrating agent was caused to react with SO$_2$. Accordingly, the desulfurizing and denitrating agent of this example had the surprising feature that each grain reacts with its central part although the reaction is a gas-solid interfacial reaction.

EXAMPLES 25–26

The water content of an aged desulfurizing and denitrating agent obtained in accordance with the composition of Example 20 was adjusted as shown in Table 15 by controlling the degree of its heat treatment.

TABLE 15

| Ex. | Proportions of used materials (%) | | | Water content in desulfurizing and denitrating agent (%) |
| --- | --- | --- | --- | --- |
| | Coal ash | Slaked lime | Calcium sulfate* | |
| 25 | 77 | 15 | 8 | 25** |
| 26 | 77 | 15 | 8 | 5*** |
| 20 | 77 | 15 | 8 | 0**** |

*The dihydrate was used. The amounts used are shown in terms of CaSO$_4$.
**Not heat-treated.
***Dried at 100° C.
****Heat-treated at 130° C. for 2 hours.

Proportions of the base materials in each of the agents, results of their performance tests conducted under the same test conditions as those employed in Examples 12–16 and their measurement results are shown in Table 16.

TABLE 16

| Example | Composition of base material (%)* | | | | Rate of SO removal (%) 130° C. | Specific surface area (m/g) |
| --- | --- | --- | --- | --- | --- | --- |
| | CaO | CaSO$_4$ | SiO$_2$ | Al$_2$O$_3$ | | |
| 25 | 15.0 | 8.3 | 47.9 | 18.4 | 40 | 49 |
| 26 | 15.0 | 8.3 | 47.9 | 18.4 | 70 | 49 |
| 20 | 15.0 | 8.3 | 47.9 | 18.4 | 100 | 49 |

*The analysis data are all on a dry basis.

The desulfurizing and denitrating agent (grain size: 3–10 mm) of Example 25 was tested under the same test conditions as those employed in Example 24. The maintenance time of 100% desulfurization rate was 8 hours. A comparison with the corresponding data of the desulfurizing and denitrating agent of Example 24 readily shows the significant effects of the heat treatment.

I claim:

1. A process for preparing a desulfurizing and denitrating agent, which comprises providing as first raw material(s) one or more materials capable of yielding calcium oxide and calcium sulfate, providing as second raw material(s) one or more materials capable of yielding silicon dioxide and aluminum oxide, mixing the first raw material(s) or a mixture of the first raw material(s) and either fractional or whole portion(s) of the second raw material(s) with water, and then subjecting the resultant aqueous mixture to wet-air aging at room temperature or to steam aging.

2. A process for preparing a desulfurizing and denitrating agent, which comprises providing as first raw material(s) one or mor materials capable of yielding calcium oxide and calcium sulfate, providing as second raw material(s) one or more materials capable of yielding silicon dioxide and aluminum oxide, mixing the first raw material(s) or a mixture of the first raw material(s) and either fractional or whole portion(s) of the second raw materials with water, subjecting the resultant aqueous mixture to wet-air aging at room temperature or to steam aging, and then subjecting the thus-aged mixture to a heat treatment at a temperature of 30° C. or higher.

* * * * *